US008402290B2

(12) United States Patent
Finkelstein et al.

(10) Patent No.: US 8,402,290 B2
(45) Date of Patent: Mar. 19, 2013

(54) POWER MANAGEMENT FOR MULTIPLE PROCESSOR CORES

(75) Inventors: Lev Finkelstein, Netanya (IL); Efraim Rotem, Haifa (IL); Aviad Cohen, Bat-Chen (IL); Ronny Ronen, Haifa (IL); Doron Rajwan, Rishon Le-Zion (IL)

(73) Assignee: Intel Corporation, Santa Clara, CA (US)

( * ) Notice: Subject to any disclaimer, the term of this patent is extended or adjusted under 35 U.S.C. 154(b) by 1091 days.

(21) Appl. No.: 12/263,421

(22) Filed: Oct. 31, 2008

(65) Prior Publication Data

US 2010/0115304 A1   May 6, 2010

(51) Int. Cl.
*G06F 1/26* (2006.01)

(52) U.S. Cl. ........................................ 713/320; 713/340

(58) Field of Classification Search .................. 713/300, 713/320, 322–324, 340
See application file for complete search history.

(56) References Cited

U.S. PATENT DOCUMENTS

| 6,232,820 | B1 | 5/2001 | Long et al. |
| 6,791,157 | B1 | 9/2004 | Casto et al. |
| 6,920,571 | B2 | 7/2005 | Shaver et al. |
| 7,386,737 | B2 | 6/2008 | Finkelstein et al. |
| 7,402,958 | B2 | 7/2008 | Nguyen |
| 7,463,993 | B2 | 12/2008 | Finkelstein et al. |
| 7,679,340 | B2 | 3/2010 | Ravichandran et al. |
| 7,685,445 | B2 | 3/2010 | Arabi et al. |
| 8,037,445 | B2 * | 10/2011 | Poirier et al. ............... 716/136 |
| 8,069,355 | B2 * | 11/2011 | Simeral et al. ............... 713/300 |
| 2004/0117673 | A1 | 6/2004 | Arabi et al. |
| 2005/0040810 | A1 | 2/2005 | Poirier et al. |
| 2006/0282692 | A1 | 12/2006 | Oh |
| 2007/0083779 | A1 | 4/2007 | Misaka et al. |
| 2007/0257650 | A1 | 11/2007 | Southwell et al. |
| 2007/0280079 | A1 | 12/2007 | Cheng et al. |
| 2007/0283178 | A1 | 12/2007 | Dodeja et al. |
| 2008/0001634 | A1 | 1/2008 | Arabi et al. |
| 2008/0005592 | A1 | 1/2008 | Allarey et al. |
| 2008/0168287 | A1 | 7/2008 | Berry et al. |
| 2008/0317086 | A1 | 12/2008 | Santos et al. |
| 2009/0089602 | A1 | 4/2009 | Bose et al. |
| 2009/0327776 | A1 | 12/2009 | Nguyen |
| 2010/0115293 | A1 | 5/2010 | Rotem et al. |
| 2010/0191997 | A1 * | 7/2010 | Dodeja et al. ............... 713/323 |

FOREIGN PATENT DOCUMENTS

| CN | 1877492 A | 12/2006 |
| CN | 101030095 A | 9/2007 |
| CN | 101901033 A | 12/2010 |
| TW | 201032038 A1 | 9/2010 |

OTHER PUBLICATIONS

Office Action Received for U.S. Appl. No. 12/263,431, mailed on Apr. 26, 2011, 9 pages.

(Continued)

*Primary Examiner* — Clifford Knoll
(74) *Attorney, Agent, or Firm* — Caven & Aghevli LLC

(57) ABSTRACT

Methods and apparatus relating to power management for multiple processor cores are described. In one embodiment, one or more techniques may be utilized locally (e.g., on a per core basis) to manage power consumption in a processor. In another embodiment, power may be distributed among different power planes of a processor based on energy-based considerations. Other embodiments are also disclosed and claimed.

30 Claims, 5 Drawing Sheets

OTHER PUBLICATIONS

Office Action Received for U.S. Appl. No. 12/165,231, mailed on Mar. 29, 2011, 10 pages.

Intel, "Power Management in Intel Architecture Servers", White Paper, Apr. 2009, pp. 1-11.

Intel, "Intel 64 and IA-32 Architectures Software Developer's Manual", vol. 3A, System Programming Guide, Part 1, May 2001, pp. 850 pages.

Sanchez, et al., "Thermal Management System for High Performance Power PC(TM) Microprocessors", IEEE, Motorola Inc., Apple Computer Corporation, 1997, pp. 325-330.

Gunther, et al., "Managing the Impact of Increasing Microprocessor Power Consumption", Intel Technology, Journal Q1, 2001, pp. 1-9.

Office Action Received for U.S. Appl. No. 12/263,431, mailed on Nov. 23, 2011, 9 pages.

Office Action Received for the Chinese Patent Application No. 200910249077.1, mailed on Jul. 16, 2012, 8 pages of Office Action and 9 pages of English Translation.

Office Action Received for German Patent Application No. 102009051387.6, mailed on Aug. 20, 2012, 6 pages of Office Action and 5 pages of English Translation.

Office Action Received for U.S. Appl. No. 12/165,231, mailed on Nov. 2, 2011, 10 pages.

Office Action Received for Chinese Patent Application No. 200910246876.3, mailed on Nov. 15, 2011, 6 pages of Office Action and 16 pages of English Translation.

Office Action Received for Chinese Patent Application No. 200910249077.1, mailed on Jan. 29, 2012, 5 pages of Office Action and 5 pages of English Translation.

\* cited by examiner

POWER MANAGEMENT FOR MULTIPLE PROCESSOR CORES

FIELD

The present disclosure generally relates to the field of electronics. More particularly, an embodiment of the invention relates to power management for multiple processor cores.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or applications of a computing device that includes such chips. For example, a portable computing device may solely rely on battery power. Hence, as additional functionality is integrated into portable computing devices, the need to reduce power consumption becomes increasingly important, for example, to maintain battery power for an extended period of time. Non-portable computing systems also face cooling and power generation issues as their IC components use more power and generate more heat.

To limit damage from thermal emergencies, one approach may utilize Dynamic Voltage Scaling (DVS). For example, when the temperature exceeds a certain threshold, the frequency and the voltage are dropped to a certain level, and then increased to another level (not necessarily the original one). In multiple core processor designs, however, such an approach would reduce performance as all cores may be penalized whether or not they are causing a thermal emergency. Another approach may use frequency throttling (which may only be a projection of DVS to frequency domain). However, the penalty for such an approach may be linear relative to the power reduction. For example, the penalty of DVS techniques may be less in part because reducing frequency by factor x is accompanied by reducing the voltage by the same factor, and the power is reduced by factor of $x^3$ as a result.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide efficient power management for multiple processor cores. As discussed above, relying on DVS may reduce performance, as all cores may be penalized whether or not they are causing a thermal emergency. In an embodiment, one or more throttling techniques may be utilized locally (e.g., on a per core basis) for one or more processor cores (e.g., in a multiple core processor), for example, that share a single power plane, in response to detection of a thermal event (e.g., detection of excessive temperature at one or more of the cores). Also, in designs with multiple power planes, power may be distributed among different power planes under energy-based definitions in accordance with one embodiment. Moreover, some embodiments may be applied in computing systems that include one or more processors (e.g., with one or more processor cores), such as those discussed with reference to FIGS. 1-7.

Figure 1:
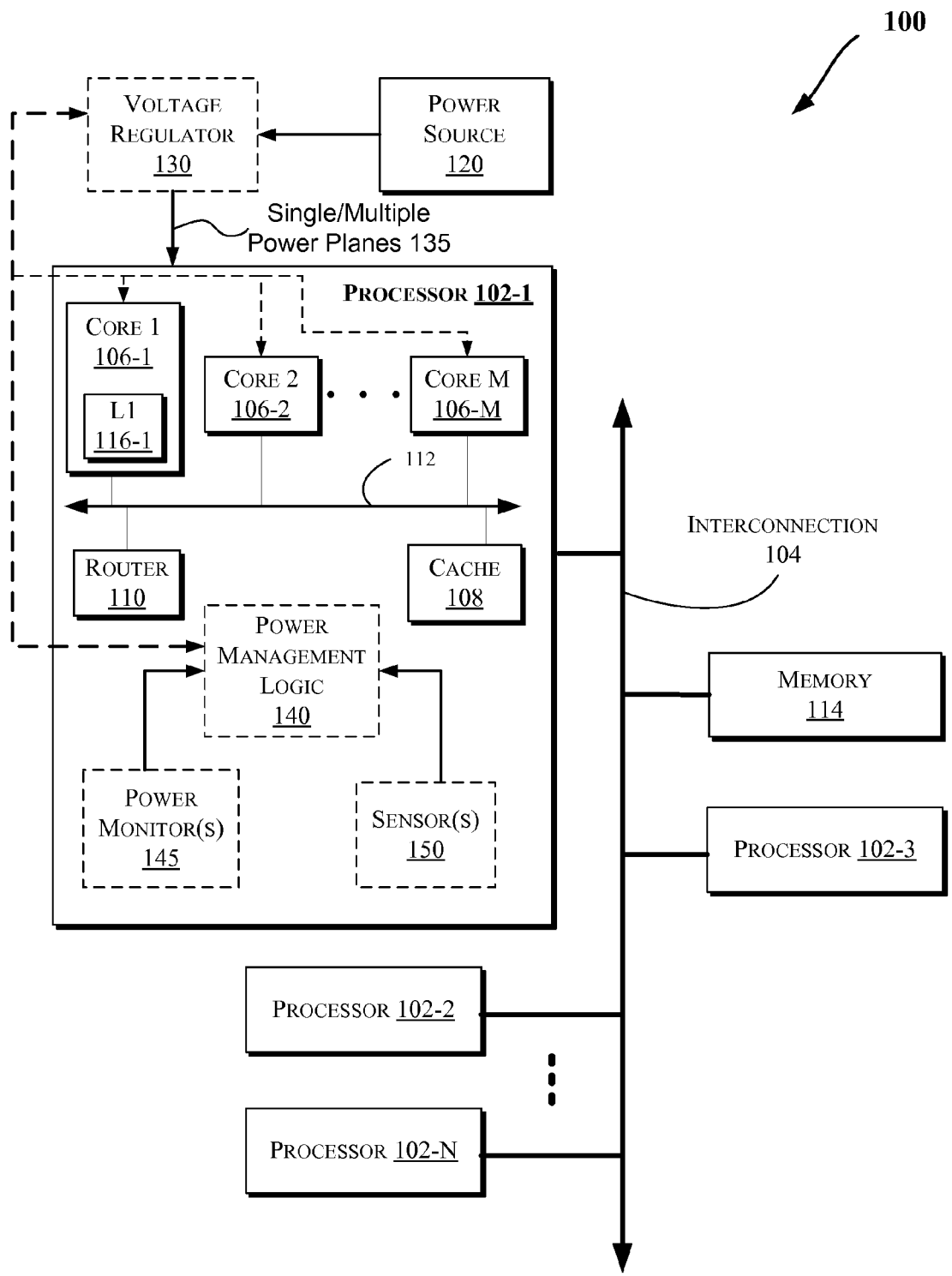
FIGS. 1, 6, and 7 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 6-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to a single power plane 135 (e.g., supplying power to all the cores 106) or to multiple power planes 135 (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power management logic 140 to control supply of power to components of the processor 102 (e.g., cores 106). Logic 140 may have access to one or more storage devices discussed herein to store information relating to operations of logic 140 such as information communicated with various components of system 100 as discussed here. As shown, the logic 140 may be coupled to the VR 130 and/or other components of system 100 (such as the cores 106). For example, the logic 140 may be coupled to receive information (e.g., in the form of one or more bits or signals) to indicate status of one or more sensors 150 (where the sensor(s) 150 may be provided proximate to components of system 100 (or other computing systems discussed herein such as those discussed with reference to other figures including 4 and 5, for example), such as the cores 106, interconnections 104 or 112, etc., to sense variations in temperature, operating frequency, operating voltage, power consumption, inter-core communication activity, etc.) and/or information from one or more power monitoring logics 145 (e.g., which may indicate the operational status of various components of system 100 such as operating temperature, operating frequency, operating voltage, operating status (e.g., active or inactive), power consumption (instantly or over a period of time), etc.). The logic 140 may instruct the VR 130, power source 120, and/or individual components of system 100 (such as the cores 106) to modify their operations. In an embodiment, variations may be sensed in such a way to account for leakage versus active power. For example, logic 140 may indicate to the VR 130 and/or power source 120 to adjust their output. In some embodiments, logic 140 may request the cores 106 to modify their operating frequency, power consumption, etc. Even though components 140, 145, and 150 are shown to be included in processor 102-1, these components may be provided elsewhere in the system 100. For example, power management logic 140 may be provided in the VR 130, in the power source 120, directly coupled to the interconnection 104, within one or more (or alternatively all) of the processors 102, etc.

Assume that we have a system of n processors, and that there is a single hot core, whose power is to be reduced by a factor of β (i.e., to be multiplied by β, which may lie between 0 and 1) in order to prevent violating thermal constraints. We measure the total slowdown of the system as a weighted sum of slowdowns of each one of the processors. For example, if one core out of 4 is slowed down by 20%, the effective frequency factor may be determined to be (3+0.8)/4 or 95%.

In an embodiment, the slowdown for different thermal management methods (where $S_{dvs}$ refers to slowdown for DVS and $S_{ft}$ refers to slowdown for frequency control) may be determined as follows:

$$S_{dvs} = \sqrt[3]{\beta} \text{ (e.g., where all cores are penalized)}$$

$$S_{ft} = \frac{n-1}{n} \times 1 + \frac{1}{n}\beta \text{ (e.g., where one core is penalized)}$$

Figure 2:
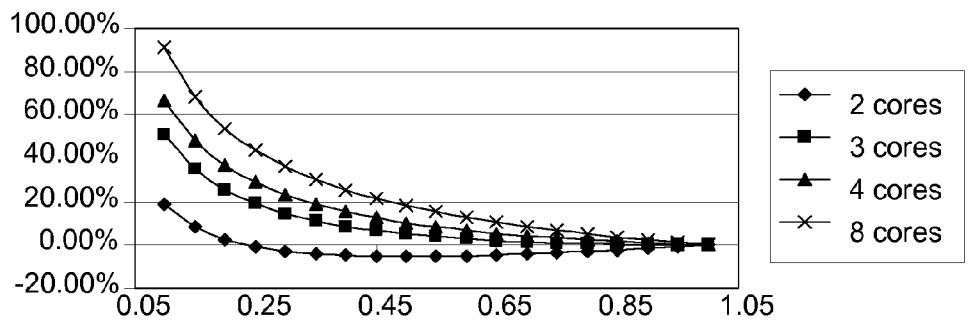
FIGS. 2 and 4 illustrate graphs according to some embodiments.

Referring to FIG. 2, examples of relative gain of pure throttling versus DVS is illustrated, in accordance with an embodiment. As discussed herein, "pure" throttling refers to situations where only one of the following is used to reduce power consumption in a processor: frequency throttling (which generally refers to projection of DVS to frequency domain only), clock gating (e.g., which involves disabling portions of circuitry where flip-flops do not change state), and/or microarchitectural throttling (e.g., where an on-chip thermal unit monitors the junction temperature of a processor and dynamically adjusts processor operational voltage and/or frequency to provide maximum performance under changing environmental conditions).

More particularly, the relationship between pure throttling versus DVS may be described by the formula $S_{ft}/S_{dvs}-1$. As can be seen by reference to FIG. 2, the gain increases with an increase in the number of cores. Note that for two cores DVS may still be more attractive for reasonable values of β in some embodiments. In an embodiment, DVS and/or throttling may be selectively applied to cores of a processor, as will be further discussed herein, e.g., with reference to FIG. 3.

In some embodiments, the determination of whether to use one or more of DVS and/or throttling may be based on the number of cores. For example, such techniques may be applied in processors with more than 2 cores. However, such techniques may also be applied to processors with less than 3 cores.

Figure 3:
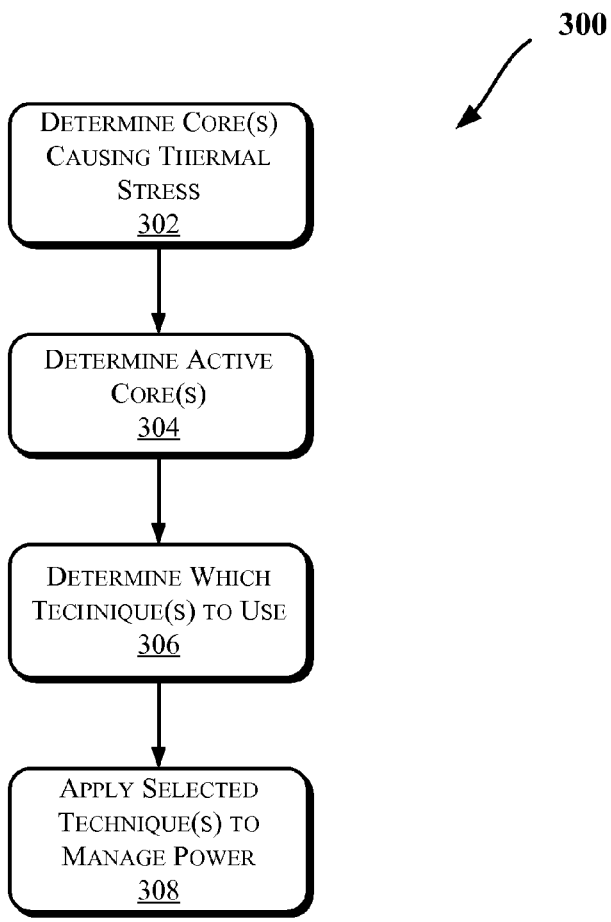
FIGS. 3 and 5 illustrate flow diagrams of methods according to some embodiments.

FIG. 3 illustrates a flow diagram of an embodiment of a method 300 to apply one or more selected techniques to multiple cores of a processor to mange power. In an embodiment, various components discussed with reference to FIGS. 1-2 and 6-7 may be utilized to perform one or more of the operations discussed with reference to FIG. 3.

Referring to FIGS. 1-3, at an operation 302, it may be determined which (and/or how many) core(s) in a multi-core processor are causing thermal issues (such as thermal stress or excessive operating temperature). For example, logic 140 may receive information from sensors 150 proximate to the cores 106. Alternatively, this may be done by estimating power consumption, e.g., via power monitor(s) 145 combined with thermal sensor(s) 150 readings.

At an operation 304, it may be determined how many cores in a processor are active and cold (e.g., at a temperature value that is below an excessive threshold temperature value, for example, as detected by the sensor(s) 150). For example, logic 140 may consider statistics (e.g., provided by monitor(s) 145, sensor(s) 150, and/or cores 106 themselves) on operating states of the cores 106 to determine which cores 106 are active and cold. At an operation 306, the information of operations 302 and/or 304 may be taken into account (including various penalties such as those discussed with reference to FIG. 2, including for example, voltage transitions penalty for DVS, etc.), and possible constraints (e.g., we may not desire to decrease the frequency of a hot core too much to maintain smooth operation of critical applications) to determine which technique(s) to use to manage power consumption in a multi-core processor. At an operation 308, the selected technique(s) may be applied to throttle or modify an operational characteristic of one or more of the cores 106 (such as an operating voltage and/or an operating frequency of a processor core 106). For example, logic 140 may consider DVS, pure throttling techniques, or some combinations thereof to control the power consumption of processors 102. Moreover, in one embodiment, operation 308 may apply a combination of the techniques, e.g., where DVS reduces all the cores to a certain power state (P-state), and the hot core is additionally slowed down by one of the pure throttling techniques.

In an embodiment, the operations of method 300 may be repeated continuously (or on a periodic basis), e.g., after operation 308, operation 302 may be resumed without delay (or after elapsing of a time period, e.g., set by a timer logic). In some embodiments, method 300 may allow a processor to decrease the thermal management performance penalty in thermally limited applications for multiple cores sharing the same power plane.

Additional power management challenges may however be present with respect to processors having multiple power planes. For example, if multiple power planes sharing the same power source 120 are present in system 100, power management may need to be satisfied for both individual constraints per power plane and global constraints per package. By doing so, it is possible to share a common package power/energy budget and allow for use of, for example, unused processor core power for more Graphics Effect(s) (GFX) performance in a GFX intensive workload, when processor resources are not fully utilized. However, the techniques discussed herein with reference to multiple power planes may also be applied to implementations that may utilize a single power plane.

Some current power-based management schemes may miss the temporal aspect of power management, since they generally address only the current point of time. Accordingly, in some embodiments, an energy budget per power plane may be used that permits: (1) to define both individual component (e.g., individual processor core) and shared constraints (e.g., shared amongst multiple components or processor cores) in a way that takes temporal aspects into account; (2) to express effective constraints corresponding to different time constants; (3) to handle the case of on-line changes in the constrains. In an embodiment, power distribution may be managed among different power planes and under energy-based definition(s).

In some embodiments, energy budget may be managed and/or power setting(s) (e.g., voltage and/or frequency changes) may be made accordingly to a current budget. Energy-based power management may be performed by controlling the energy budget defined iteratively as follows:

$$E_{n+1} = \alpha E_n + (TDP_n - P_n)\Delta t_n \quad (1),$$

where $TDP_n$ is the Thermal Design Power (TDP) power limit on step n; $P_n$ is the power spent on step n over time $\Delta t_n$, and $\alpha$ is the decay component. For example, using $\alpha=0.999$ corresponds to the window size of seconds, while using $\alpha=0.9$ corresponds to much smaller window size. The expression for $E_n$ corresponds to the energy "remainder" which is the amount of energy not consumed by the system. The value of the decay component is defined by the requirements of the time window size. Also, the TDP values may be provided by a software application or user in some embodiments.

Such energy budget corresponds to imposing an exponential mask on the difference between TDP at each time moment and the power spent at this moment, namely:

$$E(t) = \int_0^t \alpha^{t-x}(TDP(x) - P(x))\,dx.$$

Accordingly, the system (e.g., logic 140) may set TDP constraints on each of the power planes separately, or/and set TDP constraints on the whole IC package. According to the imposed constraints, multiple budgets may be maintained in some embodiments, for example per power plane for individual constraints and/or per package for shared constraints. Moreover, different budgets power per window size (expressed by $\alpha$) and/or per TDP constraints may be maintained. Note this framework smoothly handles a case when TDP is changed on-the-fly (e.g., by a software application or a user) in some embodiments. In an embodiment, a set of energy budgets, $E_n^k$ may be maintained, e.g., where k corresponds to a specific constraint, and n to the time step. One goal of such power management mechanisms is to keep the energy budgets positive, while maximizing performance.

In an embodiment, a controller budget may be defined (e.g., implemented by the logic 140). Per power plane i, we define a controller function, denoted by f'(E), which maps energy budget onto the discrete set of power states. In one embodiment, a controller, which is required to be a non-decreasing function, maps a range $[E_{low}^i, E_{high}^i]$ onto the discrete range of $[P_n^i, P_0^i]$, where $P_0^i$ is the maximal turbo state for this power plane, and $P_n^i$ is the maximal efficiency state. Budget values below $E_{low}^i$ are mapped into $P_n^i$, while budget values above $E_{high}^i$ are mapped onto $P_0^i$. Other requirements may include meeting some requirements in anchor points—for example, the zero budget corresponds to the guaranteed power state called $P_1$:

$$f^i(E) = P_n^i, E \leq E_{low}^i$$

$$f^i(0) = P_1^1$$

$$f^i(E) = P_0^i, E \geq E_{high}^i$$

Figure 4:
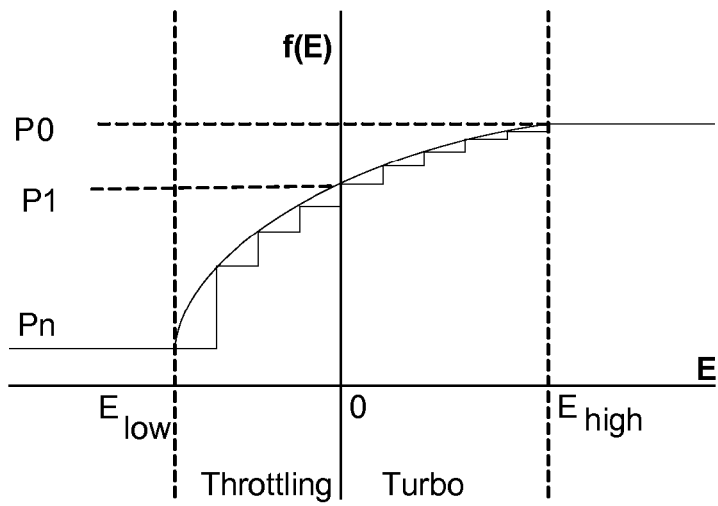

In accordance with one embodiment, an example of a controller function is shown in FIG. 4. The concrete controller may take into account the requirements of a specific power plane (such the penalty on transitions between P-states).

Regarding the constraints, assume existence of m controllers, f'(E) corresponding to different power planes. For constraint k, user (or application defined) preferences that describe how budget $E^k$ is distributed among power planes may be determined. For example, such information may be provided as an input in the form of vectors $W_k$ of length m, such that entry i corresponds to the portion of the budget that goes to power plane i. For individual constraints, a single power plane may obtain the entire budget, so the corresponding weight vector is a unit vector. In the general case, power plane i may obtain the portion of the budget:

$$E^{k,i} = W_{ki} E^k \quad (2)$$

In some cases, we may have that for a power plane i, its portion $W_{ki} E^k$ is high enough to provide maximal turbo (namely, $W_{ki} E^k \geq E_{high}^i$). In this case, the "unused" budget for this power plane, $W_{ki} E^k - E_{high}^i$ may be distributed among the rest of the power planes proportionally to their weights.

Let us denote by $E_n^{k,i}$ the portion of the budget $E^k$ that receives power plane i at step $t_n$, then the resulting P-state recommendation on this step for power plane i may be written as:

$$u_n^i = \min_k f^i(E_n^{k,i}) \quad (3)$$

Collecting the recommendations over all the constraints may provide the resulting setup per power plane. Note that the result may be an upper bound and may be further modified by other algorithms in some embodiments. Moreover, in accordance with an embodiment of the invention, an example of a flow chart for energy-based power management is shown in FIG. 5.

Figure 5:
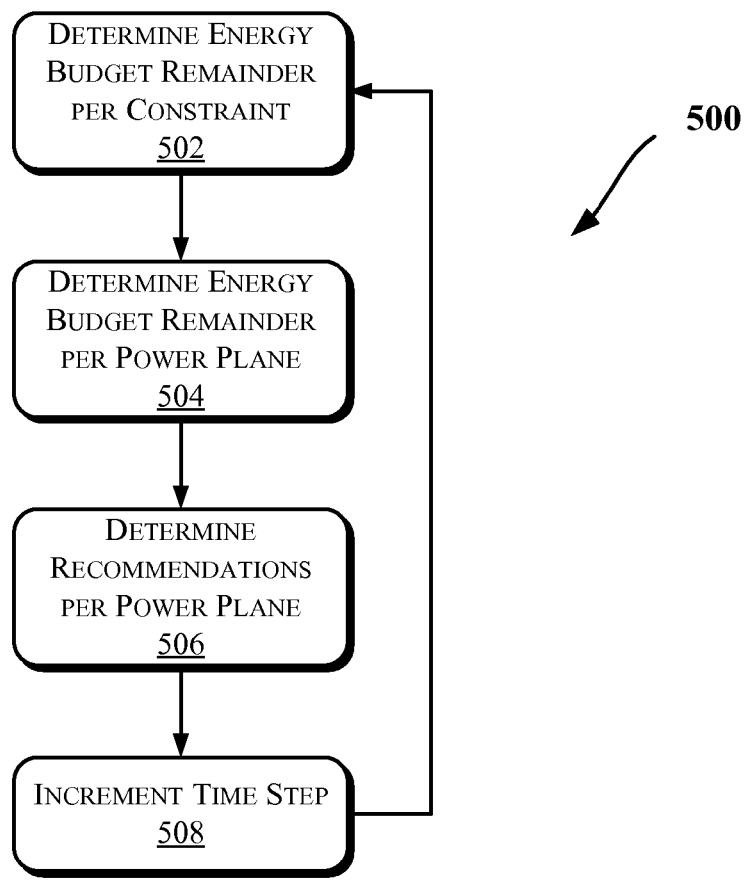

More particularly, FIG. 5 illustrates a flow diagram of an embodiment of a method 500 to apply one or more selected techniques power management operations to multiple cores of a processor. In an embodiment, various components discussed with reference to FIGS. 1-4 and 6-7 may be utilized to perform one or more of the operations discussed with reference to FIG. 5.

Referring to FIGS. 1-5, at an operation 502, the energy budget remainder per constraint $E_n^k$ may be determined (e.g., by the logic 140 in accordance with formula (1) above). At an operation 504, the energy budget remainder per power plane $E_n^{k,i}$ may be determined (e.g., by the logic 140 in accordance with formula (2) above). At an operation 506, controller recommendations per power plane $u_n^i$ may be determined (e.g., by the logic 140 in accordance with formula (3) above). At operation 508, the time step may be incremented (e.g., by logic 140), e.g., to determine future values for each power plane budget during a next time period.

In an embodiment, the operations of method 300 may be repeated continuously (or on a periodic basis), e.g., after operation 308, operation 302 may be resumed without delay (or after elapsing of a time period, e.g., set by a timer logic).

In an embodiment, the operations of method 500 may be repeated continuously (or on a periodic basis), e.g., after operation 508, operation 502 may be resumed without delay (or after elapsing of a time period, e.g., set by a timer logic). In an embodiment, techniques discussed with reference to FIGS. 2-3 may be combined with FIGS. 4-5. For example, the techniques discussed with reference to FIGS. 2-3 may be applied to multiple power plane processors. Also, the techniques discussed with reference to FIGS. 4-5 may be applied to single power plane processor.

Figure 6:
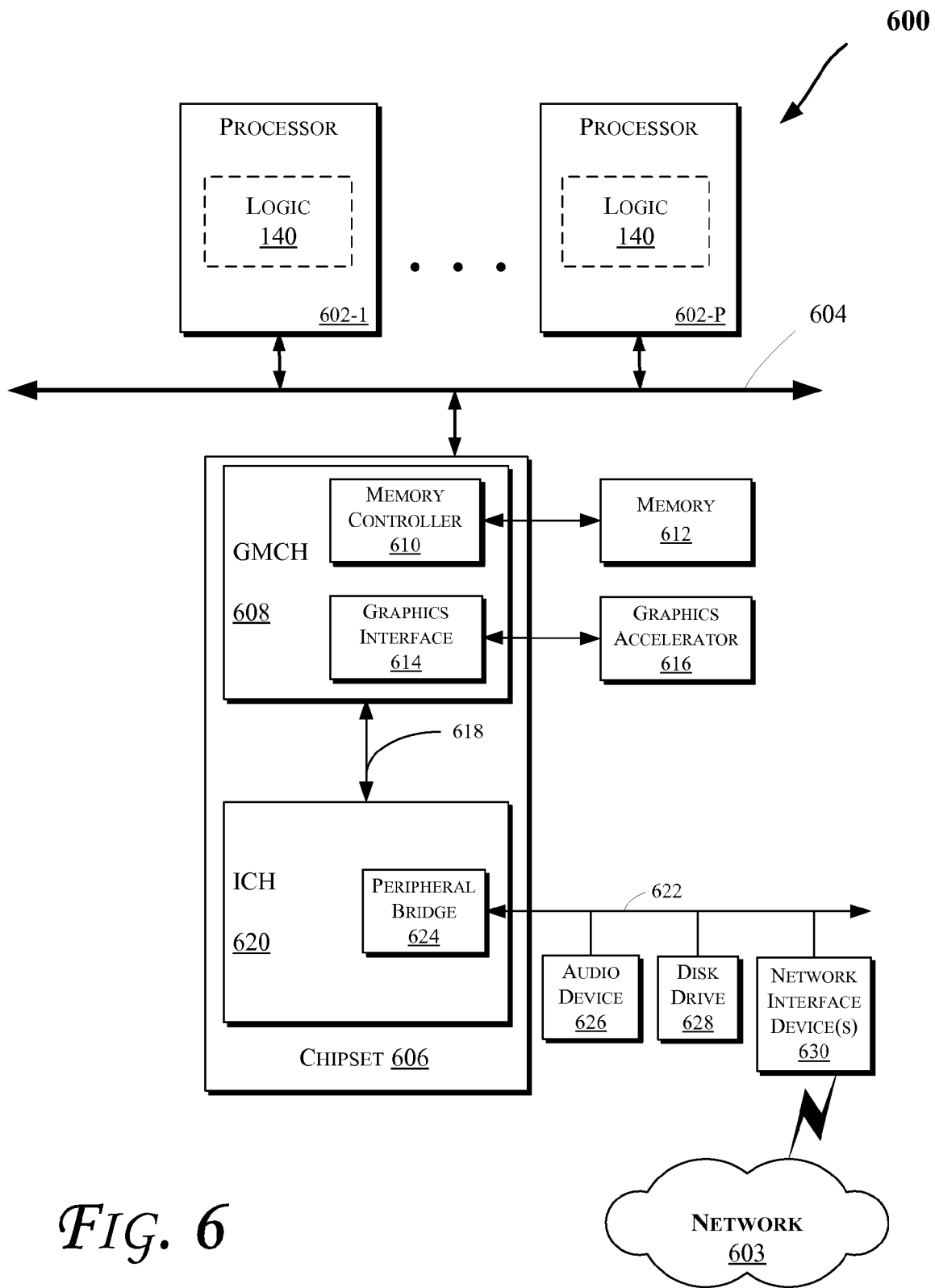

FIG. 6 illustrates a block diagram of a computing system 600 in accordance with an embodiment of the invention. The computing system 600 may include one or more central processing unit(s) (CPUs) or processors 602-1 through 602-P (which may be referred to herein as "processors 602" or "processor 602"). The processors 602 may communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. In some embodiments, one or more of the processors 602 may include one or more of the cores 106, logic 140, sensor(s) 150, and/or power monitor(s) 145 of FIG. 1. Also, the operations discussed with reference to FIGS. 1-5 may be performed by one or more components of the system 600. For example, a voltage regulator (such as VR 130 of FIG. 1) may regulate voltage supplied to one or more components of FIG. 6 at the direction of logic 140.

A chipset 606 may also communicate with the interconnection network 604. The chipset 606 may include a graphics and memory control hub (GMCH) 608. The GMCH 608 may include a memory controller 610 that communicates with a memory 612. The memory 612 may store data, including sequences of instructions that are executed by the processor 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The GMCH 608 may also include a graphics interface 614 that communicates with a graphics accelerator 616. In one embodiment of the invention, the graphics interface 614 may communicate with the graphics accelerator 616 via an accelerated graphics port (AGP). In an embodiment of the invention, a display (such as a flat panel display, a cathode ray tube (CRT), a projection screen, etc.) may communicate with the graphics interface 614 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 618 may allow the GMCH 608 and an input/output control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and one or more network interface device(s) 630 (which is in communication with the computer network 603). Other devices may communicate via the bus 622. Also, various components (such as the network interface device 630) may communicate with the GMCH 608 in some embodiments of the invention. In addition, the processor 602 and the GMCH 608 may be combined to form a single chip. Furthermore, the graphics accelerator 616 may be included within the GMCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 600 may be arranged in a point-to-point (PtP) configuration. For example, processors, memory, and/or input/output devices may be interconnected by a number of point-to-point interfaces.

Figure 7:
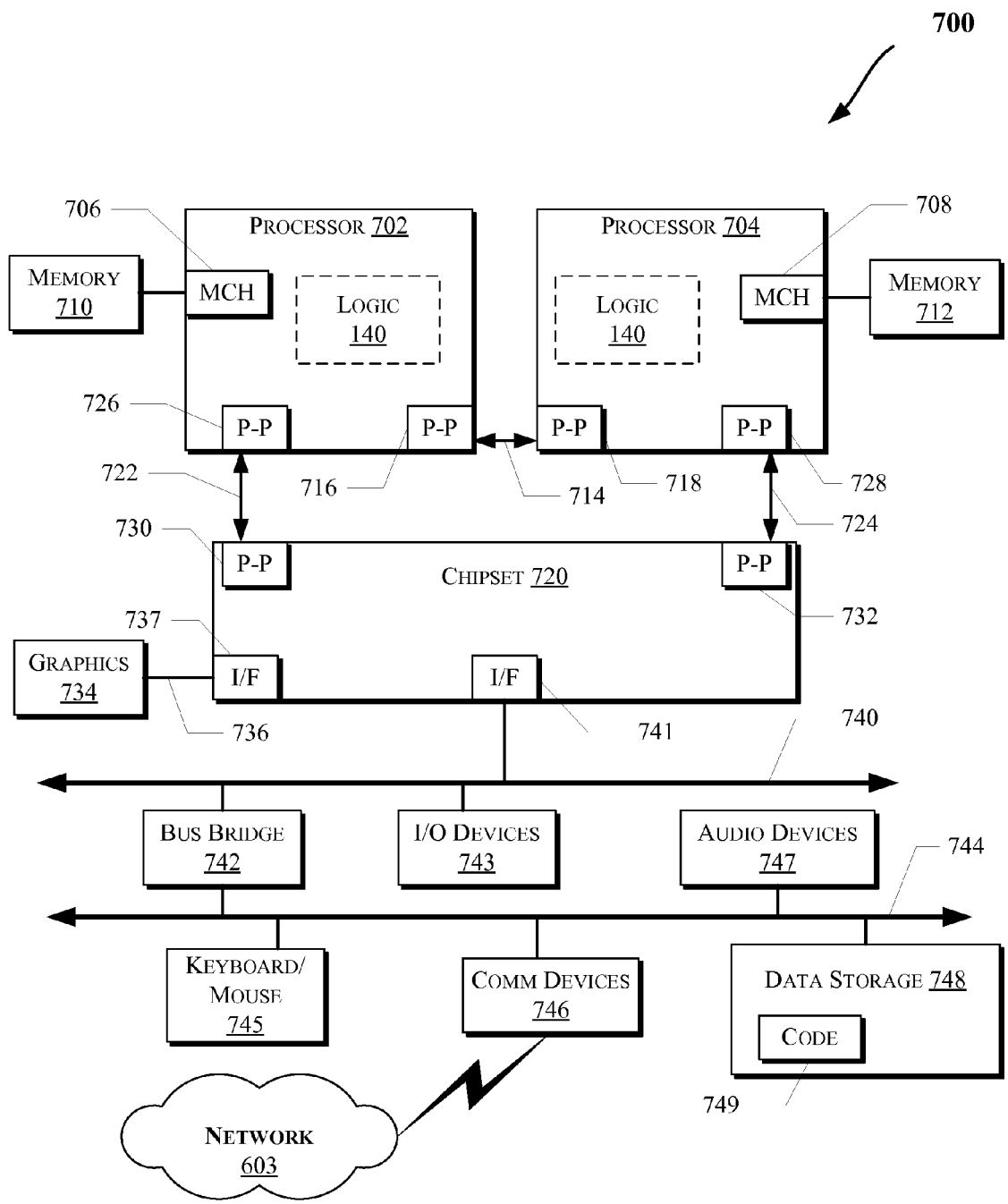

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700. For example, a voltage regulator (such as VR 130 of FIG. 1) may regulate voltage supplied to one or more components of FIG. 7.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6. Also, the processors 702 and 704 may include one or more of the cores 106, logic 140, sensor(s) 150, and/or power monitor(s) 145 of FIG. 1.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

In at least one embodiment, one or more operations discussed with reference to FIGS. 1-6 may be performed by the processors 702 or 704 and/or other components of the system 700 such as those communicating via a bus 740. Other embodiments of the invention, however, may exist in other circuits, logic units, or devices within the system 700 of FIG. 7. Furthermore, some embodiments of the invention may be distributed throughout several circuits, logic units, or devices illustrated in FIG. 7.

Chipset 720 may communicate with the bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment. Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a processor having a plurality of procesor cores;
a single power plane to supply power to more than one of the plurality of processor cores; and
a power management logic to cause a modification to an operational characteristic of at least one processor core of the plurality of processor cores in response to:
a detection of excessive temperature at the least one processor core; and
a determination of which one of the other processor cores of the plurality of processor cores are active and at a temperature value.

2. The apparatus of claim 1, wherein the temperature value is below an excessive threshold temperature value.

3. The apparatus of claim 1, wherein the power management logic is to cause: a reduction of voltage supplied to more than one cores of the processor and a reduction of the operational characteristic of the at least one processor core.

4. The apparatus of claim 1, wherein the operation characteristic of the at least one processor core comprises one or more of: an operating voltage and an operating frequency.

5. The apparatus of claim 1, further comprising one or more sensors to detect variations, corresponding to one or more of the plurality of processor cores, in one or more of: temperature, operating frequency, operating voltage, and power consumption.

6. The apparatus of claim 1, further comprising a voltage regulator to supply power to more than one cores of the processor via the single power plane.

7. The apparatus of claim 1, wherein the plurality of processor cores consist essentially of 3 or more processor cores.

8. The apparatus of claim 1, wherein the processor and the power management logic are on a single integrated circuit.

9. The apparatus of claim 1, wherein the power management logic is to determine an energy budget for each of a plurality of power planes based on:
- an energy remainder of a corresponding power plane of a plurality of power planes that indicates how much energy remained unconsumed during a previous time period; and
- one or more of a plurality of constraints corresponding to each of the plurality of power planes.

10. An apparatus comprising:
- a processor having a plurality of processor cores;
- a plurality of power planes to supply power to the plurality of processor cores;
- a power management logic to determine an energy budget for each of the plurality of power planes based on:
  - an energy remainder of a corresponding power plane of the plurality of power planes that indicates how much energy remained unconsumed during a previous time period; and
  - one or more of a plurality of constraints corresponding to each of the plurality of power planes.

11. The apparatus of claim 10, wherein the power management logic is to determine the energy remainder based on a thermal design power (TDP) limit during the time period.

12. The apparatus of claim 10, wherein the power management logic is to determine the energy remainder based on an amount of power spent over the time period.

13. The apparatus of claim 10, wherein the power management logic is to determine the energy remainder based on a decay component.

14. The apparatus of claim 10, wherein the power management logic is to determine an energy budget for each of the plurality of power planes based on all of the plurality of constraints.

15. The apparatus of claim 10, further comprising one or more sensors to detect variations, corresponding to one or more of the plurality of processor cores, in one or more of: temperature, operating frequency, operating voltage, and power consumption.

16. The apparatus of claim 10, further comprising a voltage regulator to supply power to the processor via the plurality of power planes.

17. The apparatus of claim 10, wherein the power management logic to cause a modification to an operational characteristic of at least one processor core of the plurality of processor cores in response to:
- a detection of excessive temperature at the least one processor core; and
- a determination of which one of the other processor cores of the plurality of processor cores are active and at a temperature value.

18. The apparatus of claim 17, wherein the temperature value is below an excessive threshold temperature value.

19. The apparatus of claim 17, wherein the power management logic is to cause: a reduction of voltage supplied to more than one cores of the processor and a reduction of the operational characteristic of the at least one processor core.

20. A method comprising:
- determining whether to modify an operational characteristic of at least one processor core of a plurality of processor cores in response to: a detection of excessive temperature at the least one processor core and a determination of which one of the other processor cores of the plurality of processor cores are active and at a temperature value; and
- determining an energy budget for one or more power planes, coupled to supply power to the plurality of processor cores, based on: an energy remainder of a corresponding power plane of the one or more power planes that indicates how much energy remained unconsumed during a previous time period and one or more constraints corresponding to each of the one or more power planes.

21. The method of claim 20, wherein the temperature value is below an excessive threshold temperature value.

22. The method of claim 20, wherein the operation characteristic of the at least one processor core comprises one or more of: an operating voltage and an operating frequency.

23. The method of claim 20, further comprising detecting variations, corresponding to one or more of the plurality of processor cores, in one or more of: temperature, operating frequency, operating voltage, and power consumption.

24. The method of claim 20, wherein determining the energy budget for one or more power planes is performed based on one or more of:
- a thermal design power (TDP) limit during the time period;
- an amount of power spent over the time period; and
- a decay component.

25. A system comprising:
- a processor having a plurality of processor cores;
- one or more power planes to supply power to the plurality of processor cores;
- a voltage regulator to supply power to the plurality of processor cores via the one or more power planes; and
- a power management logic to:
  - determine whether to modify an operational characteristic of at least one processor core of a plurality of processor cores in response to: a detection of excessive temperature at the least one processor core and a determination of which one of the other processor cores of the plurality of processor cores are active and at a temperature value; and
  - determine an energy budget for one or more power planes, coupled to supply power to the plurality of processor cores, based on: an energy remainder of a corresponding power plane of the one or more power planes that indicates how much energy remained unconsumed during a previous time period and one or more constraints corresponding to each of the one or more power planes.

26. The system of claim 25, further comprising one or more sensors to detect variations, corresponding to one or more of the plurality of processor cores, in one or more of: temperature, operating frequency, operating voltage, and power consumption.

27. The system of claim 25, wherein the temperature value is below an excessive threshold temperature value.

28. The system of claim 25, wherein the power management logic is to cause: a reduction of voltage supplied to more than one cores of the processor and a reduction of the operational characteristic of the at least one processor core.

29. The system of claim 25, wherein the power management logic is to determine the energy remainder based on one or more of:
- a thermal design power (TDP) limit during the time period;
- an amount of power spent over the time period; and
- a decay component.

30. The system of claim 25, further comprising an audio device.

* * * * *

UNITED STATES PATENT AND TRADEMARK OFFICE
CERTIFICATE OF CORRECTION

PATENT NO. : 8,402,290 B2  
APPLICATION NO. : 12/263421  
DATED : March 19, 2013  
INVENTOR(S) : Lev Finkelstein et al.

Page 1 of 1

It is certified that error appears in the above-identified patent and that said Letters Patent is hereby corrected as shown below:

In the Figures

On sheet 2 of 5, in Figure 3, Ref. Numeral 302, line 2, delete "TIIERMAL" and insert -- THERMAL --, therefor.

On sheet 2 of 5, in Figure 3, Ref. Numeral 306, line 2, delete "TECIINIQUE(S)" and insert -- TECHNIQUE(S) --, therefor.

In the Claims

In column 10, line 38, in claim 1, delete "procesor" and insert -- processor --, therefor.

In column 11, line 13, in claim 10, delete "cores;" and insert -- cores; and --, therefor.

Signed and Sealed this  
Twenty-fourth Day of September, 2013

Teresa Stanek Rea  
*Deputy Director of the United States Patent and Trademark Office*